April 4, 1950   R. J. McELHANNON   2,502,974
BLIND LANDING SYSTEM
Filed May 14, 1943   2 Sheets-Sheet 1
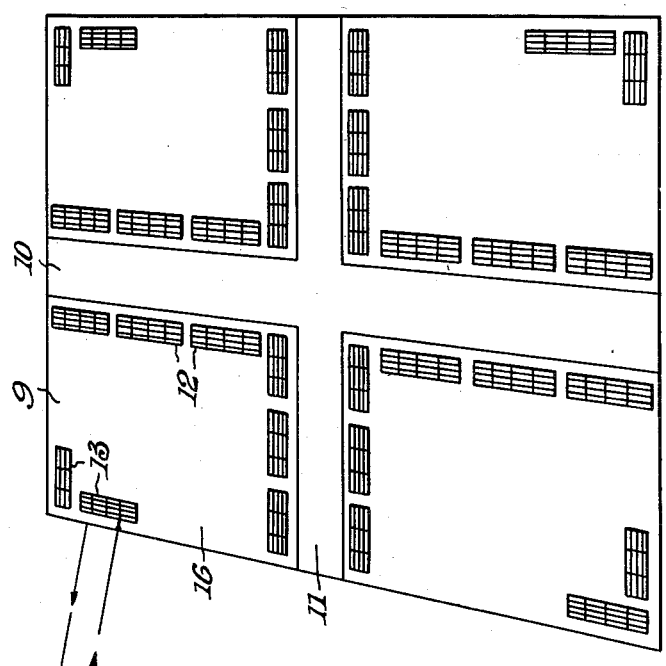
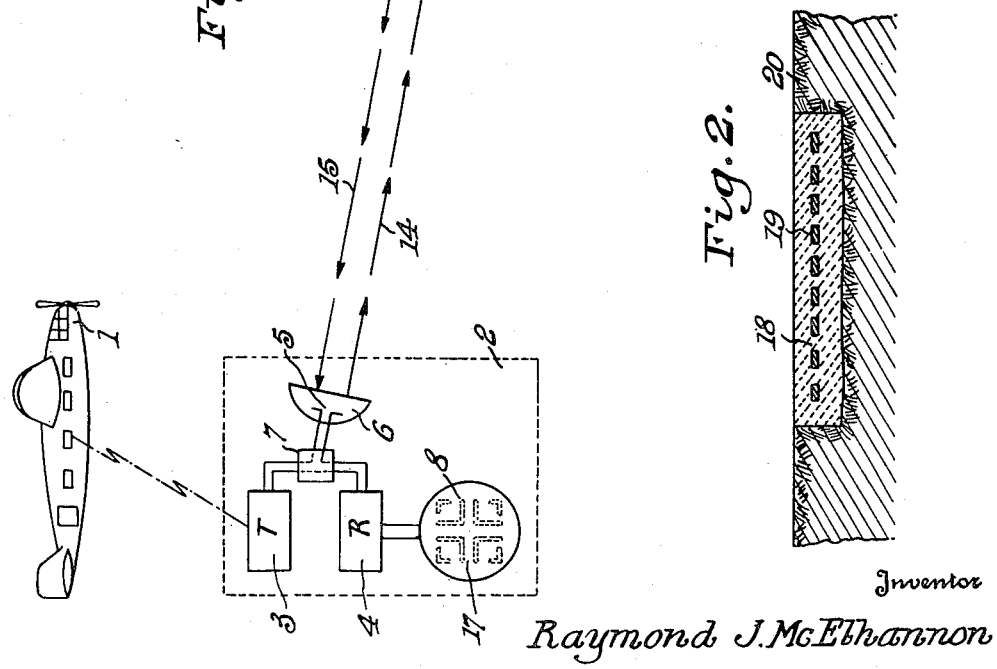
Inventor
Raymond J. McElhannon
By Harry M. Saragovitz
ATTORNEY April 4, 1950 R. J. McELHANNON 2,502,974
BLIND LANDING SYSTEM
Filed May 14, 1943 2 Sheets-Sheet 2
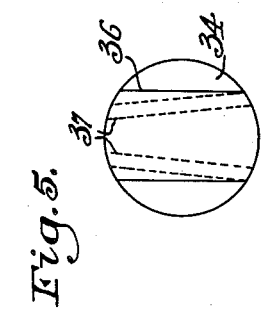
Fig. 5.
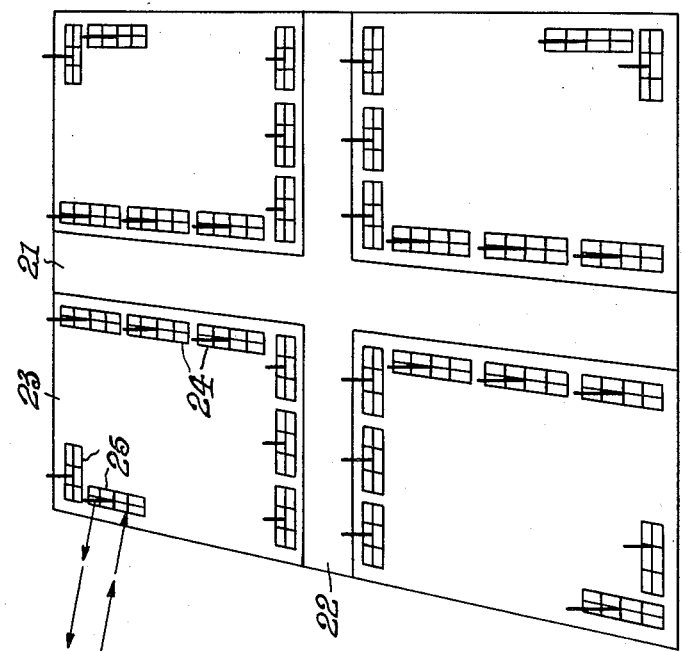
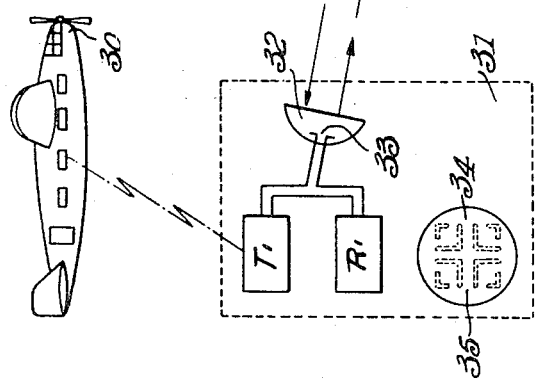
Fig. 3.
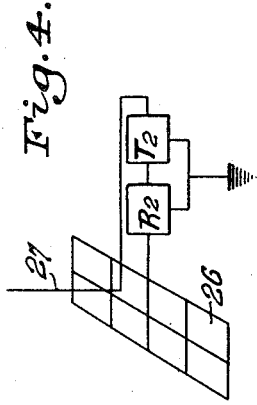
Fig. 4.
Inventor
Raymond J. McElhannon
By Harry M. Saragovitz
ATTORNEY Patented Apr. 4, 1950

2,502,974

UNITED STATES PATENT OFFICE 2,502,974

BLIND LANDING SYSTEM

Raymond J. McElhannon, Flushing, N. Y., assignor to the United States of America as represented by the Secretary of War Application May 14, 1943, Serial No. 486,944

14 Claims. (Cl. 343—10)

(Granted under the act of March 3, 1883, as amended April 30, 1928; 370 O. G. 757)

The invention described herein may be manufactured and used by or for the Government for governmental purposes without the payment to me of any royalty thereon.

This invention pertains to improvements in method and apparatus for blind landing airplanes through fog and related light-impenetrable overcast conditions, such as obscures the ground.

The various schemes heretofore in vogue for blind landing planes have proved defective or insufficient in respects and for reasons so well understood as to require no recapitulation.

The present invention embodies principles of construction and operation which are radically new insofar as is known to me.

In accordance with the principles of the invention as broadly stated, the plane is provided with a radar system including a short wave transmitter, receiver and associated cathode tube, and deflectable, directive aerial, said system being constructed and arranged to transmit short radio waves to successive portions of an area to be scanned, while meantime the beam of the cathode tube scans the screen thereof in coincidence with the scanning movement of the aerial. On the landing field, the runways, and optionally also the outlines of the field, are defined by metal members adapted during incidence thereon of the short waves transmitted from the plane radar, to cause short radio waves to be radiated therefrom to the plane radar aerial, whereby an image is produced on the cathode screen corresponding to the dispositions of said metal members defining said runways, and optionally also the outlines of said field.

In accordance with one modification of the invention, these metal members take the form of metal mats or screens disposed along the runways, or even metal reinforcing bars, embedded in the runways. These mats or reinforcing bars are preferably of steel, but other metals may be used. With this modification of the invention, the metal mats or reinforcing bars serve to return by reflection to the radar aerial, a portion of the energy transmitted therefrom. And since the percentage of reflection from these metal members is greater than that from the surrounding terrain, a distinctive image is produced on the screen of the plane radar cathode tube corresponding to the dispositions of the metal members along or within the runways. In this way the runways are defined both longitudinally and laterally. Accordingly as the plane approaches the field the image increases in size and the runways in width.

With a little experience therefore, the pilot can judge from the width of the runway image, just about when the plane can be expected to contact the ground, and accordingly when to level off. This can be facilitated by providing the cathode tube screen with suitable indicia, such as parallel etched lines, spaced apart, corresponding to the image width of a runway at the instant of landing.

With the arrangement of the landing field above described, the plane radar should be of the pulse and reflection type, adapted to transmit in rapid succession, short pulses of high frequency energy, spaced by time intervals during which the transmitter is quiescent and the receiver activated to receive and respond to reflected waves.

The above modification has the objection that as the plane approaches the ground the reflected pulses tend to merge with the transmitted pulses owing to the increasingly short time intervals therebetween, whereby the image tends to become obscured. This difficulty can be minimized by employing low power output for transmission and pulses of extremely short duration.

This difficulty can furthermore, be entirely eliminated in accordance with a second modification of the invention by employing a plane radar arranged to transmit on one frequency and to receive on a different frequency. In conjunction therewith the landing field is equipped along the runways, and optionally also along the boundaries thereof, with a succession of combined receiver and transmitter units and associated antennas, the receiver units responding to the wavelength received from the plane radar to "trigger" the associated transmitter to retransmit at the different wavelength to which the radar receiver responds, this retransmission occurring, for any given combined receiver and transmitter ground unit only so long as the radio beam from the plane is incident thereon. In this way, during scanning of the field by the plane radar, first one ground unit and then another on the landing field is energized in such a pattern as to produce on the cathode screen of the plane radar an image in the form of a series of light spots, corresponding to the disposition of these ground units along the runways and boundaries of the landing field. These ground units can be so adjusted as to power output as to produce a clear and distinct image at all times on the radar screen. And since transmission and reception at the plane radar, occurs on different frequencies or wavelengths, there is no interference between them, and a clean image is retained on the radar screen until the plane lands.

Although pulse type transmission and reception can be employed for the radar with this modification, it is not necessary to do so. The plane radar can, and preferably is of the continuous wave type which transmits continuously and without interruption during scanning. This reduces the power level required for transmission, and simplifies the construction in that, among other things, no device is required for alternately cutting off the transmitter and activating the receiver, such as is necessary for pulse type transmission.

Referring now to the drawings:

Figure 1 shows in schematic form, an arrangement in accordance with the first modification of the invention above described, according to which the plane radar is of the pulse type and the landing field is provided with metal mats disposed along the runways and at the corners of the landing field for mapping out its boundaries.

Figure 2 is a detail in section of a runway with the metal members embedded therein, in contrast to the metal mat arrangement of Figure 1.

Figure 3 is a diagrammatic showing similar to Figure 1, of the second modification above referred to, wherein the plane radar is of the continuous wave type transmitting and receiving on different frequencies, the landing field being equipped along the runways and landing field boundaries with combined receiver and transmitter units as above mentioned.

Figure 4 is an enlarged schematic showing of one of the combined receiver and transmitter or "ground units" employed on the landing field in the Figure 3 modification.

Figure 5 is a detail of the cathode tube screen with indicia marked thereon to illustrate their utility in landing.

Referring to Figure 1, there is shown an airplane 1, equipped with a radar 2, comprising a short wave pulse transmitter 3, and a receiver 4, both of which are connected to the dipole antenna 5, of a "spinner" or parabolic reflector 6, through a switching unit 7, the latter for alternately connecting the transmitter 3, and the receiver 4, to the antenna 5.

The spinner 6, is mechanically arranged, to scan the area to be searched in radial, spiral, or like fashion, to give a complete picture of the area scanned; and the receiver 4, is of such construction as to provide an image of the area scanned on the screen 8, of an associated cathode ray tube. The radar system per se requires no detailed illustration or explanation as its construction and operation are known to those skilled in the art. Also, standing alone, it forms no part of the present invention.

The air field, is shown generally at 9, and, in accordance with the first mentioned modification of the invention, the runways 10 and 11, are lined with metal mats, screens, or equivalent 12, of steel or other metal, extending in strip-like fashion, as shown along each of the sides thereof.

Also for outlining the contour of the field, other metal mats, as indicated at 13, are disposed and spaced about the boundaries of the field.

In the operation of the system, as the plane 1 approaches the field, the spinner 6, will transmit in rapid succession, short pulses of short radio waves 14, to successive portions of the field during intervals that the transmitter is connected to the spinner through the switch 7. During the remaining intervals, the radio waves 15, reflected from the ground will be returned to the spinner 6, and through the switch 7, to the receiver 4, to produce an image of the area scanned on screen 8 of the cathode tube. Since, as before noted, the metal mats 12 and 13, outlining the runways and boundaries of the airfield, will cause the radio waves to be reflected to a markedly greater degree than those reflected from the earth portions 16, and the concrete portions or runways 10 and 11, an image of the airfield will appear somewhat as indicated at 17, on the screen of the cathode tube, wherein the runways and boundaries of the field are greatly differentiated from the remaining areas. With this image before him, the operator can bring the plane accurately down to the field through overcast, and line it up directly with the particular runway on which he desires to land. Moreover, as the plane descends the image will increase in size and thus, as stated, advise the operator as to his proximity to the ground and to the runway.

Even when landing through overcast the operator will ordinarily be able to see the ground within a few hundred feet thereof, so that he can complete the landing visually. But, if he cannot, the cathode ray image will be sufficiently accurate to land the plane safely, and in wholly blind fashion. An altimeter may be provided as a check on the height of the plane above the ground at any instant.

It will be understood, of course, that the image definitions obtained on the cathode screen will depend on the resolving power of the radar equipment, which in turn is an inverse function of the radio wave length employed. A reasonably good definition is obtainable at wavelengths of about 3 m., but wavelengths of about 1 cm. down to about 0.5 cm. or less are preferred. Radio waves of 1 cm. or even 0.5 cm. will easily penetrate fog, snow, rain, etc., without appreciable dissipation, whereas light rays, as well as ultra-violet and infra-red or heat waves will not. Accordingly, the present invention assures safe landing through overcast in contrast to the existing systems employing light rays, etc., as aforesaid. Also, the present invention overcomes the well known objections to existing blind landing systems employing radio waves, such as radio beams, glide paths, etc., with which the pilot must more or less "feel his way" down to landing.

Referring now to Figure 2, in this arrangement, the metal members are embedded in the concrete or asphalt runways themselves, as compared to the exposed metal mat arrangement of Figure 1. A runway is shown in section at 18, with metal reinforcing bars embedded therein, as at 19, the adjacent terrain being indicated at 20. With this arrangement, the image of the entire runway as shown on the cathode screen will stand out in relief against a darker background.

Referring now to the modification of Figure 3, the runways 21, 22, of an airfield 23, are lined, at spaced intervals, with a succession of combined receiving and transmitting ground units, as at 24 in Figure 3, and shown more in detail in Figure 4. Additional such ground units may be provided at the boundaries of the field, as at 25, to map out its contour.

As shown more particularly in Figure 4, each ground unit includes a receiving antenna 26, arranged horizontally above the ground in the form of an elongated wire network or mesh as shown. The receiving antenna is connected to the input of a receiving unit R—2, tuned to respond to a short wave frequency F—1. The output of receiver R—2 is connected to the input of an associated transmitter T—2, in such manner as to "trigger" the transmitter to transmit from an associated vertical aerial 27, a different frequency F—2, from that to which the receiver R—2 responds. The vertical type aerial is employed for the transmitter T—2 in order that radiation therefrom will occur with equal intensity in all directions, so that signals therefrom can be picked up by the radar of an approaching plane irrespective of its direction of approach.

An airplane 30, approaching the field 23, is equipped with a radar system 31, having the usual "spinner" 32, adapted to scan the entire area of the field progressively, as for example, radial or spiral scanning. Connected to the dipole aerial 33, of the "spinner" is a continuous wave transmitter T—1, arranged to transmit continuously on the frequency F—1, to which the airfield receivers R—2, are responsive. As the spinner sweeps across successive areas of the field, first one receiving antenna 26, Fig. 4, and then another lining the runways will be energized by the transmitted waves of frequency F—1. During such energization, the receiver R—2, interposed in such aerial will "trigger" the associated transmitter T—2, causing it to radiate the different frequency, F—2, from the associated vertical antenna 27. The waves of frequency F—2 so transmitted from the vertical antenna will be radiated uniformly in all directions and hence be picked up in part by the spinner of the radar system on the plane so long as the spinner is directed toward that particular antenna. Connected to the dipole aerial 33, of the spinner is a radio receiver R—1, responsive to this frequency, F—2. This receiver is connected to a cathode ray tube 34, having a sweep corresponding to the scanning of the spinner.

Accordingly, as the spinner sweeps across successive portions of the air-field, and thus transmits frequency F—1 to first one air-field receiving antenna and then to another, the associated vertical antennas will radiate at a frequency F—2, back to the spinner so long as the spinner is directed to any particular air-field ground unit 24 or 25. These waves so transmitted from successive air-field vertical antennas will produce a series of light spots on the cathode screen, which spots will be arranged in conformity with an image 35 of the pattern of the airfield antennas along the runways of the field, as well as along the boundaries thereof if desired.

In this way, the pilot has before him on the cathode screen, in the form of a succession of light spots, a continuous image of the outline of the air-field and runways, so that he can bring the plane to the ground safely through overcast, i. e. fog, rain, sleet, etc., or could land at night without lights.

The image is not lost or "blanked out" in this case as the plane approaches the field, due to the fact that the radar scanning system is transmitting on a frequency F—1, while the cathode screen image producing waves thereof is received on a different frequency, F—2. Accordingly, the waves transmitted from the radar unit do not interfere with those received from the airfield ground units, even though the same spinner 32, and associated dipole antenna 33, are used for transmission and reception thereof.

A strong image will be produced at all times on the cathode screen by reason of the above and the further fact that the image is not based on reflected waves but on waves generated and transmitted from the air-field antennas, the intensity of which can be made as strong or as weak as desired. An additional advantage of this modification over that of Figure 1 is that it avoids the necessity of using pulse transmission and accompanying alternate paralyzing and activating of the receiving unit, the objections of which are now well understood.

The lengths of the receiving antennas 26, Figure 4, are adjusted in conformity with the resolving power of the radar system to produce a coarse or fine image 35, on the cathode screen of the radar, depending on its degree of resolution. By virtue of this feature, radar systems now in current use, such as those operating on a wave length of 10 centimeters, could be immediately applied successfully to the blind landing of airplanes with the system proposed herein; although radar operating on wavelengths of 1 to 3 centimeters is preferred.

The cathode screen image is not lost or "blanked out" as the plane approaches the field, but remains and becomes increasingly enlarged as the plane approaches a runway and is brought directly to ground. With a little practice and by gauging the increase in size of the image, the pilot will know about when the wheels will be expected to touch. In fact, appropriate indicia can be marked on the cathode screen to indicate the width of the image at which landing will occur, and the pilot would merely line up the light spots of the image with these indicia. Referring to Figure 5, such indicia markings are shown at 36, 37 on the cathode screen 34. At the instant of landing the runway image would be about as shown at 37.

The present invention is not limited in its ability to locating through overcast, landing fields and the runways threeof, but the principles enumerated herein may be extended to mapping out the entire courses of airlines, especially commercial airlines, between distant points. Thus at intervals along the line of flight of a commercial airline, metal members may be arranged in characteristic design on the ground, to be picked up on the plane radar and thus advise the pilot as to his exact location at any given instant.

Preferably the line of flight may be mapped out by mounting along the course on the ground, a series of combined receiving and transmitting ground units like that of Figure 4. With this latter arrangement, the plane radar will periodically pick up definite signals from these ground units as the plane flies its course, these ground units thereby functioning as radio beacons to guide the pilot along his course. Accordingly, even though the plane is flying absolutely blind, it will be guided accurately along its course to the landing field and to a safe landing thereat. Danger spots along the course, such as high mountains, can be especially marked out with a series of metal members or beacons as aforesaid, to be automatically picked up on the plane radar and thus warn the pilot well in advance as to his position of flight in relation thereto.

It is claimed:

1. A system for blind landing airplanes, comprising: an airplane equipped with a radar system including short wave transmitter and receiver, a variably deflectable aerial system connected thereto for directing transmitted waves to successive portions of an area to be scanned, a cathode ray tube for said receiver having means for causing the cathode beam to scan the screen thereof in coincidence with the scanning of said directive aerial system, a landing field provided with runways, metallic means defining said runways and responding to waves transmitted from said aerial system to cause short radio waves to be radiated therefrom to said aerial system, whereby during scanning of said field by said aerial system, an image is produced on said cathode screen corresponding to the disposition of said metallic means defining said runways.

2. A system for blind landing airplanes, comprising: an airplane equipped with a radar system including short wave transmitter and receiver, a variably deflectable aerial system connected thereto for directing transmitted waves to successive portions of an area to be scanned, a cathode ray tube for said receiver having means for causing the cathode beam to scan the screen thereof in coincidence with the scanning of said directive aerial systems, a landing field provided with runways, metal members defining said runways, said metal members being adapted to reflect back to said aerial system, radio waves received therefrom, whereby during scanning of said field by said aerial system an image is produced on said cathode screen corresponding to the disposition of said metal members defining said runways.

3. A system for blind landing airplanes, comprising: an airplane equipped with a radar system including short wave transmitter and receiver, a variably deflectable aerial system connected thereto for directing transmitted waves to successive portions of an area to be scanned, a cathode ray tube for said receiver having means for causing the cathode beam to scan the screen thereof in coincidence with the scanning of said directive aerial system, a landing field provided with runways, metal members defining said runways and the outline of said field, said metal members being adapted to reflect back to said aerial system, radio waves received therefrom, whereby during scanning of said field by said aerial system, an image is produced on said cathode screen corresponding to the disposition of said metal members, defining said runways and the outline of said field.

4. A system for blind landing airplanes, comprising: an airplane equipped with a pulse and echo type of radar system, including short wave transmitter, a receiver and associated cathode ray tube, and a variably deflectable directive aerial, connected thereto for transmitting short pulses of high frequency waves to successive portions of an area to be scanned and for reproducing in coincidence therewith on the screen of said cathode ray tube, an image derived from reflections of said transmitted waves, a landing field provided with runways, and metal members defining said runways adapted, by reflection of said transmitted waves, to produce a distinctive image of said runways on said cathode tube screen.

5. A system for blind landing airplanes, comprising: an airplane equipped with a radar system of the pulse and echo type, including short wave transmitter, a short wave receiver and associated cathode ray tube, and a variable deflectable directive aerial, connected thereto for transmitting short pulses of high frequency waves to successive portions of an area to be scanned and for reproducing in coincidence therewith on the screen of said cathode ray tube, an image derived from reflections of said transmitted waves, a landing field provided with runways, metal members defining said runways both longitudinally and laterally, said members being adapted, by reflection of said transmitted waves, to produce a distinctive image of said runways on said cathode tube screen.

6. A system for blind landing airplanes, comprising: an airplane equipped with a radar system of the pulse and echo type, including short wave transmitter, a short wave receiver and associated cathode ray tube, and a variably deflectable directive aerial, connected thereto for transmitting short pulses of high frequency waves to successive portions of an area to be scanned and for reproducing in coincidence therewith on the screen of said cathode ray tube, an image derived from reflections of said transmitted waves, a landing field provided with runways, metal members defining said runways both longitudinally and laterally, said members being adapted, by reflection of said transmitted waves, to produce a distinctive image of said runways on said cathode ray tube screen, and indicia so positioned with respect to said cathode screen as to indicate the correct width of the screen image of a runway on landing, whereby the plane pilot may correctly line up the plane with the runway for landing and be advised as to the instant of ground contact.

7. A system for blind landing airplanes, comprising: an airplane equipped with a radio pulse and echo type of detection system including a short wave transmitter, a short wave receiver and associated cathode ray tube, and a variably deflectable directive aerial system connected thereto for directing transmitted waves to successive portions of an area scanned and utilizing accompanying reflected waves for producing on the screen of said cathode ray tube, an image of the area scanned, a landing field provided with runways, metal means defining said runways and responding to radio waves incident thereon from said pulse and echo system to cause radio waves to be radiated therefrom to said system, whereby during scanning of said field by said system, an image is produced on the screen of said cathode ray tube corresponding to the disposition of said metal means defining said runways.

8. A system for blind flying an airplane between distant points, comprising: an airplane equipped with a radio pulse and echo type detection system including a short wave transmitter, a short wave receiver and associated cathode ray tube, and a variably deflectable directive aerial system connected thereto for directing transmitted waves to successive portions of a scanned area and utilizing reflected radio waves for producing on the screen of said cathode ray tube an image of the area scanned, and means for producing on said screen a distinctive image along the flying course between said distant points, said means comprising ground supported metal members mounted at intervals along said course, said metal members being adapted to reflect back to said pulse and echo detection system, radio waves received therefrom.

9. The method of aerial navigation which enables a pilot to cause his aircraft to follow a desired course which includes defining the course on the ground with a series of relatively high efficiency reflectors laid out in a regular pattern, propagating a beam from the aircraft, causing the beam to systematically scan the ground below the aircraft, and indicating the relative position of any reflected portions of the beam, the reflected portions of the beam giving an indication of course and altitude.

10. An aerial navigation system for enabling a pilot to fly an aircraft over a predetermined course comprising means on the aircraft for propagating a narrow ultra high-frequency radio beam, means for causing the beam to systematically and repeatedly scan the ground below the aircraft, reflecting means on the ground laid out in a regular pattern along the predetermined course for reflecting said beam to the aircraft when it falls thereupon, and means on the aircraft for indicating its course and altitude by the relative location of the reflecting means when a reflection occurs.

11. An aerial navigation system for enabling a pilot to fly an aircraft over a predetermined course comprising means on the aircraft for propagating a narrow ultra high-frequency radio beam, means for causing the beam to systematically and repeatedly scan the ground below the aircraft, reflecting means substantially uniformly ocated on the ground along the predetermined course for reflecting said beam to the aircraft when it falls thereupon, and means on the aircraft for indicating the course and altitude of he aircraft by the relative location of the reflecting means when a reflection occurs.

12. An aerial navigation system for enabling a pilot to fly an aircraft over a predetermined ourse comprising means on the aircraft for propagating a narrow ultra high-frequency radio eam, means for causing the beam to systematically and repeatedly scan the ground below the ircraft, reflecting members arranged in pairs on he ground along the predetermined course for eflecting said beam to the aircraft when it falls hereupon, the members of each pair being disosed so that an imaginary line connecting the nembers of each pair lies substantially at right ngles to the desired course of flight, and means n the aircraft for indicating the relative locaion of the reflecting means when a reflection ocurs, the course and altitude of the aircraft being adicated thereby.

13. An aerial navigation system for enabling pilot to fly an aircraft over a predetermined ourse comprising means on the aircraft for propagating a narrow ultra high-frequency radio beam, means for causing the beam to systematically and repeatedly scan the ground below the aircraft, reflecting members arranged in pairs on the ground along the predetermined course for reflecting said beam to the aircraft when the beam falls thereupon, the members of each pair being disposed so that an imaginary line connecting the members of each pair lie substantially at right angles to the desired course of flight, the members of each pair being uniformly spaced apart across the predetermined course, and said pairs being substantially uniformly spaced along said predetermined course, the course and altitude of the aircraft being indicated thereby.

14. An aerial navigation system for enabling a pilot to fly an aircraft over a predetermined course comprising means on the aircraft for propagating a highly directional ultra high-frequency radio beam, means for causing the beam to systematically and repeatedly scan the ground below the aircraft, reflecting members substantially uniformly arranged on the ground along a predetermined desired course for reflecting said beam to the aircraft when it falls thereupon, an indicating screen in view of the pilot on the aircraft arranged to represent the portion of the ground being scanned by said radio beam, and means for producing image spots on said screen corresponding to the relative location of said reflecting members on the portion of the ground scanned by said radio beam, the relative position of the image spots being an indication of the course and altitude of the aircraft.

RAYMOND J. McELHANNON.

REFERENCES CITED

The following references are of record in the file of this patent:

UNITED STATES PATENTS

| Number | Name | Date |
| --- | --- | --- |
| 1,384,014 | Fessenden | July 5, 1921 |
| 2,134,716 | Gunn | Nov. 1, 1938 |
| 2,151,549 | Becker | Mar. 21, 1939 |
| 2,178,237 | Linder | Oct. 31, 1939 |
| 2,204,628 | Sorensen | June 18, 1940 |
| 2,212,110 | Beuermann | Aug. 20, 1940 |
| 2,226,860 | Greig | Dec. 31, 1940 |
| 2,231,929 | Lyman | Feb. 18, 1941 |
| 2,267,715 | Bowen | Dec. 30, 1941 |
| 2,279,246 | Podliasky et al. | Apr. 7, 1942 |
| 2,405,231 | Newhouse | Aug. 6, 1946 |
| 2,408,848 | Hammond | Oct. 8, 1946 |

FOREIGN PATENTS

| Number | Country | Date |
| --- | --- | --- |
| 542,634 | Great Britain | Jan. 21, 1942 |
| 702,686 | Germany | Jan. 23, 1941 |